United States Patent [19]

Kjohl et al.

[11] 4,118,242

[45] Oct. 3, 1978

[54] PROCESS FOR MANUFACTURING CONCRETE OF HIGH CORROSION RESISTANCE

[75] Inventors: Olav Kjöhl, Heistad; Paul Henrik Olstad, Brevik, both of Norway

[73] Assignee: Aksjeselskapet NORCEM, Oslo, Norway

[21] Appl. No.: 815,418

[22] Filed: Jul. 13, 1977

[30] Foreign Application Priority Data

Jul. 9, 1976 [NO] Norway ................................. 762401

[51] Int. Cl.² .............................................. C04B 7/02
[52] U.S. Cl. ................................................... 106/98
[58] Field of Search ........................................ 106/98

[56] References Cited

U.S. PATENT DOCUMENTS

| | | | |
|---|---|---|---|
| 2,410,954 | 11/1946 | Sharp ....................... | 106/98 |
| 3,135,617 | 6/1964 | Newell et al. .............. | 106/98 |
| 3,880,664 | 4/1975 | Schulze ..................... | 106/98 |
| 3,969,567 | 7/1976 | Occleshaw et al. ......... | 106/98 |

*Primary Examiner*—James Poer
*Attorney, Agent, or Firm*—Wenderoth, Lind & Ponack

[57] ABSTRACT

Concrete having high resistance to corrosion is prepared by using low aluminate ($C_3A$) cement, preferably having less than 5 weight per cent of aluminate, and, in addition to conventional concrete constituents, at least 10 weight per cent of finely divided reactive silica based on the cement weight.

A highly corrosion resistant cement composition comprises, in addition to conventional cement constituents, 70 – 90 parts by weight of low aluminate cement and 10 – 30 parts by weight of reactive silica.

An additive useful for making concrete highly corrosion resistant comprises 80 – 90 weight per cent of reactive silica, 0 – 10 weight per cent of low aluminate cement, 3 – 8 weight per cent of formaldehyde condensed sodium sulfonate, 3 – 8 weight per cent of lignosulfonate.

13 Claims, No Drawings

PROCESS FOR MANUFACTURING CONCRETE OF HIGH CORROSION RESISTANCE

The present invention relates to the manufacture of corrosion resistant concrete compositions having especially high resistance against attack from concentrated salt solutions such as nitrates, chlorides and sulfates.

Concrete made from the most common types of hydraulic cement, such as Portland cement, are known to be relatively resistant to corrosion in air and water and under conditions where iron and steel structures are less resistant. In more aggressive environments, e.g. by concentrated salt attacks from nitrate, sulfate and chloride solutions, the concrete surface and structures are also exposed to strong corrosion. One example exists in connection with the extensive spreading of salt on roads and other areas carrying traffic. Under Norwegian winter conditions extreme damage has been caused to the concrete in bridges, roads, etc.

Chemical process industry and the production of chemicals in bulk represent other fields where corrosion damage to concrete causes serious problems.

Today some of the most acute corrosion problems seem to be encountered in connection with concrete exposed to nitrate solutions. The concrete floors of bulk stores for nitrogenous fertilizer products, such as NPK, ammonium nitrate, calcium nitrate etc., are severely damaged within a short period. So far, little has been done in explaining the mechanism of this corrosion. Instead one has tried to protect the most exposed surfaces by special coatings, such as asphalt, synthetic resins etc. However, this has not been very successful, since the coatings have either been too expensive or have been lacking in the required resistance.

A great number of different additives and compositions are known from the prior art which are expected to improve the mechanical and chemical properties of cement and concrete. Thus, the so-called pozzolana additives are known to improve the corrosion resistance to some degree. Pozzolana consists of finely divided, pulverized, silica-containing fillers which, apart from filling the pores of the concrete to some degree also acts as a binding agent for the lime component, Ca-(OH)$_2$. The latter is formed during the hardening of the concrete whereby less soluble and more resistant compounds are formed. Commonly used pozzolanas are made from fly ash which contains varying amounts of carbon (1-20%). The presence of carbon, however, is rather unfavourable since it causes more shrinking of the concrete. In addition to fly ash, natural pozzolanas like diatomite, etc. are also used. Most of the natural pozzolanas, in addition to amorphous silica also contain large amounts of iron oxides and alumina. Some compounds, being inactive in the natural state, can be activated by calcination. Addition of pozzolana is known to improve the concrete's ability to resist attacks from sea water and other aqueous liquids. It has also been suggested that the addition of pozzolana might prevent reaction between the alkaline components of the cement and the alkali sensitive skeleton, the latter being responsible of the binding capacity of the concrete. However, particularly with respect to the resistance to corrosion in salt-containing and other strongly corrosive environments, no concrete composition is known which possesses a sufficiently effective protection against corrosion.

From the patent literature it is known per se to use finely divided, amorphous SiO$_2$ of the reactive type formed by sublimation and quenching of silica-containing raw-material, as additives to cement compositions. One example of this type of reactive silica, in the following termed "reactive silica," is silica fines recovered during the purification of flue gases from melting furnaces in the manufacture of ferrosilicon.

U.S. Pat. No. 2,410,954 (Sharp) discloses a hydraulic cement modified by incorporating 3-5 weight percent of highly reactive silica of the above mentioned type. According to the patent, this addition makes the cement particularly suited for making mortar, stuccature, etc.

Finally, it is also known in the art to use reactive silica as a filler in cement in amounts of up to 10 weight percent, based on the weight of the cement.

The main object of the present invention is to provide a new and improved method of manufacturing concrete of such a high corrosion resistance that it will be resistant also in the most corrosive environments such as, e.g., concentrated nitrate salt solutions.

Said object is attained by the improved method of manufacturing concrete according to the present invention: the improvement comprising that a concrete mixture is made using a low aluminate cement, preferably comprising less than 5 weight percent of aluminate (C$_3$A), and that at least 10 weight percent of finely divided, reactive silica is added, blended and uniformly distributed in the concrete mixture in order to react completely with calcium hydroxide formed in connection with the hydration of the calcium silicates contained in the cement, whereupon the concrete is cast and subjected to aftertreatment in the usual known manner.

Further specific features of the present method will appear from the following disclosure.

A further object of the present invention is to provide a cement composition comprising 70 to 90 parts by weight of low aluminate cement, 10 to 30 parts by weight of reactive silica as well as minor amounts of commonly used cement additives, such as, e.g., dispersing agents.

By the term "low aluminate cement" a cement is meant which has low aluminate (C$_3$A) content, preferably less than 5 weight percent.

EXPERIMENTS

Concrete compositions were prepared according to the invention using different amounts of the reactive silica, in Series I using 0% and 10% silica, and in Series II using 0, 5, 10, 15, 20, 25 and 40% silica, by weight calculated on the cement.

There were used two types of cement, one low in aluminate, i.e. about 1.6%, and the other with an aluminate content of 8.5%. The chemical compositions of these cements are specified as follows:

Type 1: SR-cement (sulfate resistant cement): 55% 3 CaO.SiO$_2$ (C$_3$S), 20% 2 CaO.SiO$_2$ (C$_2$S) 1.6% 3 CaO.Al$_2$O$_3$ (C$_3$A) and 15.2% 4 CaO.Al$_2$O$_3$.Fe$_2$O$_3$ (C$_4$AF) (Common abbreviations used below are given in brackets).

Type 2: Ordinary Portland cement PC 300: 60% C$_3$S, 14% C$_2$S, 8.5% C$_3$A, and 9% C$_4$AF The sand composition used had the following specifications:

| Sand: 0–4 mm | |
|---|---|
| Retained on 4 mm sieve: | 3 – 5 % |
| 2 mm sieve: | 23 – 28% |
| 1 mm sieve: | 60 – 76% |
| 0.5 mm sieve: | 90 – 93% |
| 0.25 mm sieve: | 96 – 98% |
| 0.125 mm sieve: | 97 – 99% |

The blending operation was performed with two constant water/cement (w/c) ratios, viz., 0.45 and 0.75.

The blending of the cement and sand was performed such that the consistency was 10 cm slump. Thus, the concrete compositions in the test series represent the mortar part of the concrete in a common quality range.

Corrosion tests were carried out on 544 standard mortar prisms having the dimensions 4 cm × 4 cm × 16 cm.

Series I

The prisms were stored vertically in saturated salt solutions, the liquid level of which reached half way up on the prisms, without being in contact with the undissolved salt crystals at the bottom of the container. For control tests another set of prisms were completely submerged. The test pieces were cured in water at 20° C. for 28 ± 4 days before being exposed to a saturated calcium nitrate solution at about 20° C. This solution was selected because it was found to give extreme corrosion. The calcium nitrate used contains in solid form 85% $NH_4NO_3.5\ Ca(NO_3)_2.10\ H_2O$ and 15% $Ca(NO_3)_2$. On the average, 10 weight percent of silica was added, based on the amount of cement used.

Bearing in mind that lower w/c ratios provide a better resistance, the results of the tests of this series are summarized in the following Table I.

TABLE I

| Time of exposure months | PC 300 | | SR-cement | |
|---|---|---|---|---|
| | 0% $SiO_2$ | 10% $SiO_2$ | 0% $SiO_2$ | $SiO_2$ |
| 1 | Fissures | Not attacked | Fissures | Not attacked |
| 2 | Corrosion and fissures | " | Corrosion and fissures | " |
| 3 | Strongly attacked | " | Strongly attacked | " |
| 4 | Some remaining compression strength | " | Some remaining compression strength | " |
| 5 | Completely destroyed | Fissures | Completely destroyed | " |
| 6 | " | Fissures | " | " |
| 10 | " | Cracks | " | " |
| 14 | " | 70% of the test pieces strongly attacked | " | 15% of the test pieces attacked |

Apart from ocular tests and inspection of photographs, compression strength values were also measured in connection with these tests. These measurements verify the data stated in Table I.

On the basis of the ocular tests we have reached the conclusion that SR-cement + 10% $SiO_2$ provides a durability 10 times that of normal concrete.

However, we found for PC 300 as well as for SR-cement a slightly decreasing compression strength (after 6 months and, in particular, after 10 months).

This indicates that adding 10% $SiO_2$ is not sufficient and that the optimum amount must be somewhat higher. Said estimate is also supported by our theoretical calculations based on the chemical reaction equations and the experiments of Series II given below.

Series II

This series comprised about 800 specimens in the form of mortar prisms having the dimensions 4 cm × 4 cm × 16 cm which were cured for 28 ± 3 days in water at 20° C. and then dried for 50 ± 3 days at 20° C. and 50% R.H. before being exposed to salt solutions which, in addition to nitrate salt solutions also comprised sulphate and chloride salt solutions.

In contrast to Series I, two thirds of the prisms were now stored vertically, the saturated salt solution reaching half way up on said prisms, but the lower 2 cm thereof were actually immersed in the salt sludge.

The remaining one third of the specimens were completely immersed in the salt sludge. The same materials as in Series I were utilized and the consistency was 5–6 cm slump.

Due to the amount of $SiO_2$ fines addition being systematically varied, viz., 0-5-10-15-20-25-40% $SiO_2$, calculated on the total amount of cement, it was not possible to maintain a constant w/c factor. Two constant mixing ratios of cement:sand = 1:2 and 1:3.3 were selected, which, at the selected consistency, provided the following w/c ratios:

| Mixing ratio | $SiO_2$ addition in % | | | | | | |
|---|---|---|---|---|---|---|---|
| Cement:sand | 0 | 5 | 10 | 15 | 20 | 25 | 40 |
| 1:2 | 0.39 | 0.41 | 0.44 | 0.53 | 0.61 | 0.72 | 1.15 |
| 1:3.3 | 0.52 | 0.56 | 0.61 | 0.70 | 0.79 | 0.91 | 1.44 |

9 months have passed since the specimens of Series II were exposed to aggressive materials. In chloride and sulfate solutions attacks have been recorded for 0 and 5% $SiO_2$ additions under storage in sulfate and calcium chloride solutions, whereas, obviously, more time is needed for the higher additions.

For the above indicated storage conditions in calcium nitrate solution the results can be summarized as indicated in the following Table II:

TABLE II

| $SiO_2$ fines | Cement | Mixing ratio cement: sand | Exposure time in months | | | | |
|---|---|---|---|---|---|---|---|
| | | | 1 | 3 | 6 | 9 | 12 | 15 |
| 0% | PC300 | 1:2 | R | S/T | 0 | | | |
| | | 1:3.3 | VA | 0 | | | | |
| | SR | 1:2 | R | S/T | 0 | | | |
| | | 1:3.3 | S/T | 0 | | | | |
| 5% | PC300 | 1:2 | O | VA | VA | 0 | | |
| | | 1:3.3 | R | VA | 0 | | | |
| | SR | 1:2 | O | R | VA | 0 | | |
| | | 1:3.3 | O | S/T | 0 | | | |
| 10% | PC300 | 1:2 | O | R | VA | 0 | | |
| | | 1:3.3 | O | S/T | VA | 0 | | |
| | SR | 1:2 | O | O | S/T | VA | | |
| | | 1:3.3 | O | R | VA | 0 | | |
| 15% | PC300 | 1:2 | O | O | O | R | | |
| | | 1:3.3 | O | O | O | S/T | | |
| | SR | 1:2 | O | O | O | O | | |
| | | 1:3.3 | O | O | O | O | | |
| 20% | PC300/SR | 1:2/1:3.3 | O | O | O | O | | |
| 25% | " | " | O | O | O | O | | |
| 40% | " | " | O | O | O | O | | |

O = NOT ATTACKED
R = FISSURES
S/T = CRACKS/CORROSION
VA = SUBSTANTIALLY ATTACKED
0 = DETERIORATED

By studying photographs of these specimens it is found, what is previously known, that a better mixing ratio (a lower w/c factor) is advantageous and that $SiO_2$ additives should be above 10%. At $SiO_2 = 0$ no difference between both of the indicated cement qualities is observed.

At 5% $SiO_2$ there are indications in favour of SR-cement, and at 10% $SiO_2$ there are significant differences.

The experiments confirm the following hypothesis behind our present work in this field:

Corrosion attacks can be attributed to a combination of two mechanisms:

1. Mere acid attacks caused by the reaction of $Ca(OH)_2$ formed in the concrete during the hydration process — with $NH_4$-containing salts and thereby driving off $NH_3$ according to the following equation:

$$NH_4NO_3 + Ca(OH)_2 \rightarrow Ca(NO_3)_2 + NH_3.$$

2. The calcium nitrate formed reacts gradually with hydrated calcium aluminate, for instance in the following way:

$$3\,CaO.Al_2O_3 + Ca(NO_3)_2.4\,H_2O \rightarrow$$

$$3\,CaO.Al_2O_3.Ca(NO_3)_2.10\,H_2O.$$

This reaction product corresponds to an increase in volume, which will break down the concrete and cause cracks in the structure.

By selecting a cement low in aluminate one can secure the presence of only small amounts of aluminates, which might react with salt molecules that penetrate into the concrete. Further, the addition of silica will secure that $Ca(OH)_2$ which always is formed as a reaction product during the hydration of calcium silicates while the concrete is curing, will not be available in connection with a starting acid attack. The silica will in fact react with $Ca(OH)_2$ during the course of its formation. The reactions are believed to be the following:

$$Ca(OH)_2 + SiO_2 \rightarrow CaO.SiO_2 + H_2O \qquad 1.$$

$$3\,Ca(OH)_2 + SiO_2 \rightarrow 3\,CaO.2\,SiO_2 + 3\,H_2O \qquad 2.$$

According to these reactions further calcium silicate hydrates are formed. Thus, the reaction product according to Equation 2 is tobermorite which is the most important binding agent of concrete. The increase in the strength of the concrete confirms that the latter reaction (Equation 2) occurs. We assume that maximum corrosion resistance will be achieved when all the calcium hydroxide formed has reacted with silica and thereby has been converted to silicate. Theoretically, this means that, for optimum effect, 10-25 weight percent of $SiO_2$ (based on the weight of cement) should be added to the commercial-cement qualities tested. However, positive effects are obtained also by using smaller amounts. We have used silica amounts of 5, 10, 15, 20, 25 and 40 percent in our experiments (cf. the above), and obtained satisfactory results in the most aggressive and corrosive environments. In practice, an upper limit of 30% $SiO_2$ will be used.

In the manufacture of the concrete according to the invention the active components may be added individually from separate supplies.

Adding $SiO_2$ fines alone, however, provides a significant increase in the water demand and water/cement ratio, as well as a certain increased shrinkage. The said drawbacks can be overcome and the concrete quality improved by adding dispersing agents and other commercially available concrete additives to the $SiO_2$ fines.

According to the invention the said objects are attained and, at the same time, the handling and dosing of the silica fines is improved by means of a specific additive composition particularly suited for use in the preparation of the concrete. This composition is prepared separately and is packed in suitable bags and the like. During the preparation of the concrete, further cement low in aluminate is added until optimum weight ratios have been obtained.

The said additive composition has the following formulation:

80-90 weight percent of reactive silica
0-10 weight percent of low aluminate cement
3-8 weight percent of Lomar D ® (formaldehyde condensed sodium sulfonate)
3-8 weight percent of lignosulfonate A preferred floor concreting composition has the following formulation:

80 weight percent of $SiO_2$ fines
10 weight percent of SR-cement containing 1.6% $C_3A$
5 weight percent of Lomar D
5 weight percent of lignosulfonate.

The composition is packed and used as an additive in a SR-cement (having $C_3A < 5\%$) in an amount of 20% calculated on the cement weight.

With 300 kg cement per $m^3$ concrete + 60 kg additive as stated above, the water/cement ratio was reduced from 0.64 to 0.45 and the compression strength after 28 days increased from 330 kp/cm² to 850 kp/cm².

Per se, it is possible to avoid completely the content of cement low in aluminate in the above mentioned additive composition and instead optimize the composition by varying the amounts of the other stabilising additives.

We claim:

1. In a method of manufacturing concrete having resistance to corrosion, which comprises mixing cement, sand, water, reactive silica and, optionally, conventional concrete additives, the improvement wherein the cement has a low aluminate content, and at least 10 weight percent of finely divided, nonpozzolanic, reactive silica, based on the weight of the cement, is incorporated in and distributed uniformly throughout the concrete.

2. A method according to claim 1, wherein the cement has an aluminate content of less than 5 weight percent based on the weight of the cement.

3. A method according to claim 2, wherein the reactive silica is added to the concrete in an amount of 10-30 weight percent based on the weight of the cement.

4. A method according to claim 2, wherein the reactive silica is added to the concrete in an amount of 10-25 weight percent based on the weight of the cement.

5. A method according to claim 2, wherein the reactive silica is added to the concrete in an amount of 15-25 weight percent based on the weight of the cement.

6. A method according to claim 2, wherein the cement is sulfate resistant cement having an aluminate content of 1.6 weight percent and further containing 55 weight percent of $3CaO.SiO_2$, 20 weight percent of $2CaO.SiO_2$ and 15 weight percent of $4CaO.Al_2O_3.Fe_2O_3$.

7. A method according to claim 2, wherein the reactive silica is silica fines recovered during purification of flue gases from a melting furnace used in manufacturing ferrosilicon.

8. A cement composition having corrosion resistance, comprising 70-90 parts by weight of cement having a low aluminate content, 10-30 parts by weight of nonpozzolanic, reactive silica and, optionally, minor amounts of conventional cement additives.

9. A composition according to claim 8, wherein the cement has an aluminate content of less than 5 weight percent based on the weight of the cement.

10. A composition according to claim 9, wherein the reactive silica is silica fines recovered during purification of flue gases from a melting furnace used in manufacturing ferrosilicon.

11. An additive for imparting corrosion resistance to concrete, comprising:

80-90 weight percent of nonpozzolanic, reactive silica,
0-10 weight percent of cement having a low aluminate content,
3-8 weight percent of formaldehyde condensed sodium sulfonate, and
3-8 weight percent of lignosulfonate.

12. An additive according to claim 11, wherein the cement has an aluminate content of less than 5 weight percent based on the weight of the cement.

13. An additive according to claim 12, comprising:

80 weight percent of nonpozzolanic, reactive $SiO_2$ fines,
10 weight percent of sulfate resistant cement containing 1.6 weight percent of aluminate,
5 weight percent of condensed naphthalene sulfonates, and
5 weight percent of lignosulfonate.

* * * * *